(12) United States Patent
Asmanis et al.

(10) Patent No.: US 8,744,029 B2
(45) Date of Patent: Jun. 3, 2014

(54) METHOD AND APPARATUS FOR QUANTIFYING CHARACTERISTICS OF A RECEIVED SERIAL DATA STREAM

(71) Applicant: Avago Technologies General IP (Singapore) Pte. Ltd., Singapore (SG)

(72) Inventors: Georgios Asmanis, Lake Forest, CA (US); Faouzi Chaahoub, San Jose, CA (US); Ajay Kumar Yadav, Santa Clara, CA (US); Sriramkumar Sundararaman, Belmont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 65 days.

(21) Appl. No.: 13/626,526

(22) Filed: Sep. 25, 2012

(65) Prior Publication Data

US 2014/0086291 A1   Mar. 27, 2014

(51) Int. Cl.
*H04B 1/10*  (2006.01)

(52) U.S. Cl.
USPC ................ 375/354; 375/316; 375/377

(58) Field of Classification Search
USPC ......... 375/219, 222, 316, 324, 340, 354, 355, 375/360, 377
See application file for complete search history.

(56) References Cited

U.S. PATENT DOCUMENTS

| | | | |
|---|---|---|---|
| 7,424,382 B2 | 9/2008 | Steinbach et al. | |
| 7,602,869 B2 * | 10/2009 | Emami-Neyestanak et al. | 375/355 |
| 8,074,126 B1 | 12/2011 | Qian et al. | |
| 8,126,039 B2 | 2/2012 | Mobin et al. | |
| 2008/0304557 A1 | 12/2008 | Hollis | |
| 2012/0230454 A1 * | 9/2012 | Mobin et al. | 375/354 |

OTHER PUBLICATIONS

Bell, et al., Robust Methof for Addressing 12 Gbps Interoperability for High-Loss and Crosstalk-Aggressed Channels, Designcon 2012, available at http://cdn.ecroy.com/files/whitepapers/designcon_2012_robust_method_for_addressing_12 gbps_interoperability_for high-loss_and_crosstalk-aggressed_channels.pdf.

\* cited by examiner

*Primary Examiner* — Dac Ha

(57) ABSTRACT

A data stream monitor includes an analog front end (AFE) and a digital state machine. The AFE receives recovered clock and data signals at a first rate. The AFE uses the recovered clock and a phase interpolator to generate a phase-adjusted clock signal at a second rate slower than the first rate. The AFE uses a detector operating with the phase-adjusted clock signal to generate a representation of the data signal generated from comparisons of the data signal with two reference voltages. A logical combination of the results from the comparisons generates a signal that identifies when the data signal voltage is near the common-mode voltage. The digital state machine generates a strobe signal at a third rate slower than the second rate. The strobe signal is used by the AFE to sample the signal. The sample is forwarded to the digital state machine where it is stored.

20 Claims, 9 Drawing Sheets

| COMP_HI | COMP_LO | OUTPUT |
|---------|---------|--------|
| 0 | 0 | NO HIT |
| 0 | 1 | HIT |
| 1 | 0 | INVALID |
| 1 | 1 | NO HIT |

SIGNAL CONDITION
EVALUATION TABLE

METHOD AND APPARATUS FOR QUANTIFYING CHARACTERISTICS OF A RECEIVED SERIAL DATA STREAM

TECHNICAL FIELD

The invention relates to communications networks over which data is serially communicated in the form of time-varying signals transmitted and received over various data transmission media.

BACKGROUND

Digital communication receivers sample an incoming waveform and then reliably detect the sampled data. Typically, a receiver includes a Clock and Data Recovery (CDR) system to recover the clock and data from an incoming data stream. The CDR system generates a clock signal having the same frequency and phase as the incoming signal, which is then used to sample the received signal and detect the transmitted data.

The quality of the received signal is often impaired by inter-symbol interference (ISI), crosstalk, echo, and other noise. In addition, impairments in the receiver itself may further degrade the quality of the received signal. The received signal can be viewed as a well-known "data eye," which is a superposition of a number of impaired individual signals with varying frequency components, for example, due to ISI and other noise. As the various impairments increase, the quality of an eye diagram or eye trace derived from or otherwise detected by observation of the received signal is impaired.

An eye diagram corresponds to a superposition of samples of a serial data signal over a unit interval of the data signal (i.e., the shortest time period over which the data signal can change state). An eye diagram may be generated by applying the serial data signal to the vertical input of an oscilloscope and triggering a horizontal sweep across the unit interval based on the data rate of the serial data signal. When the serial data signal corresponds to a pseudorandom data signal, the superposed samples appear on the oscilloscope display as an eye diagram with an eye opening bounded by two regions where the data signal voltage approaches the common-mode voltage. Various features of the eye opening reveal information about the quality of the communications channel over which the serial data signal is transmitted. For example, a wide eye opening indicates that the serial data signal has a relatively low noise level and a relatively low bit-error rate, whereas a narrow eye opening indicates that the serial data signal has a relatively high noise level and a relatively high bit-error rate.

"Eye margining" is a technique by which the height and width, or margins, of a data eye can be measured. The eye margin of a receiver can be evaluated following the manufacturing process, or prior to deployment in a given application, to determine if the receiver satisfies one or more predefined margin criteria. If the receiver does not satisfy the one or more predefined margin criteria, the device can be rejected or one or more device parameters can be modified and the margin criteria can be reevaluated. Eye margining is often performed using a classical jitter tolerance technique and eye histogram techniques.

An eye diagram typically is evaluated based on the width of the eye opening, the height of the eye opening, and the rate of closure of the eye opening with variation of the sampling time. The width of the eye opening corresponds to the time interval over which the serial data signal can be sampled without inter-symbol interference. The height of the eye opening corresponds to a measure of the signal-to-noise ratio of the serial data signal. The rate of closure of the eye opening with variation of the sampling time indicates the sensitivity of the serial data signal to timing errors.

Various eye margining or monitoring circuits have been developed that measure one or more characteristic features of an eye diagram of a serial data signal in real-time. The measured features typically are used to correct distortions that are introduced into the serial data signal by the communication channel. For example, the frequency responses of some adaptive equalizers are optimized based on measurements of current signal quality as indicated by one or more characteristic eye diagram features.

In a first conventional approach, a feedback control loop is completed by introducing an error signal at the input to a charge pump to generate an analog signal which is further fed back through phase shifters. This approach is disadvantageous as it provides limited data. In an alternative conventional approach, separate single-quadrant phase rotators are used to generate phase-varying input signals to parallel paths including multiple stage flip flops. While this alternative approach enables the detection of all signal data transitions, it significantly increases the power consumption of the circuit.

SUMMARY

An apparatus quantifies characteristics of a serial data stream over a time interval. An embodiment of the apparatus is a serial data stream monitor with an analog front end (AFE) and a digital state machine. The AFE receives a data signal and a clock signal operating at a first rate. The AFE includes a phase interpolator, a signal condition detector and a down converter. The signal condition detector generates a representation of the amplitude of the serial data stream at a signal condition detector output in response to a phase-adjusted signal from a phase interpolator operating at a second rate that is slower than the first rate and in response to a comparison of the serial data stream and first and second reference signals. The down converter receives the representation of the amplitude of the serial data stream from the signal condition detector. The digital state machine includes logic and a data store. The digital state machine generates a strobe output that is coupled to a control input of the down converter. The digital state machine receives the representation of the serial data stream from the down converter and records the same in the data store.

An embodiment of a method for quantifying a characteristic of a received serial data stream includes the steps of receiving recovered data and clock signals in an analog front end, the received data and clock signals operating at a first rate, using a phase interpolator and the received clock signal to generate a phase-adjusted half-rate clock signal, using comparators responsive to the phase-adjusted half-rate clock signal to determine the relative voltage of the data signal with respect to a first reference voltage and a second reference voltage, the comparators generating a first result and a second result, respectively, logically combining the first result and the second result to generate a signal, using a digital state machine to generate a strobe signal operating at a rate that is lower than the rate of the phase-adjusted half-rate clock, using the strobe signal to generate a sample of the signal and using the digital state machine to record a characteristic of the sample.

These and other features and advantages of the method and apparatus will become apparent from the following description, drawings and claims.

BRIEF DESCRIPTION OF THE DRAWINGS

The apparatus and method for quantifying characteristics of a serial data stream can be better understood with reference to the following drawings. The components in the drawings are not necessarily to scale, emphasis instead being placed upon clearly illustrating the principles of the present invention.

DETAILED DESCRIPTION OF ILLUSTRATED EMBODIMENTS

Figure 1:
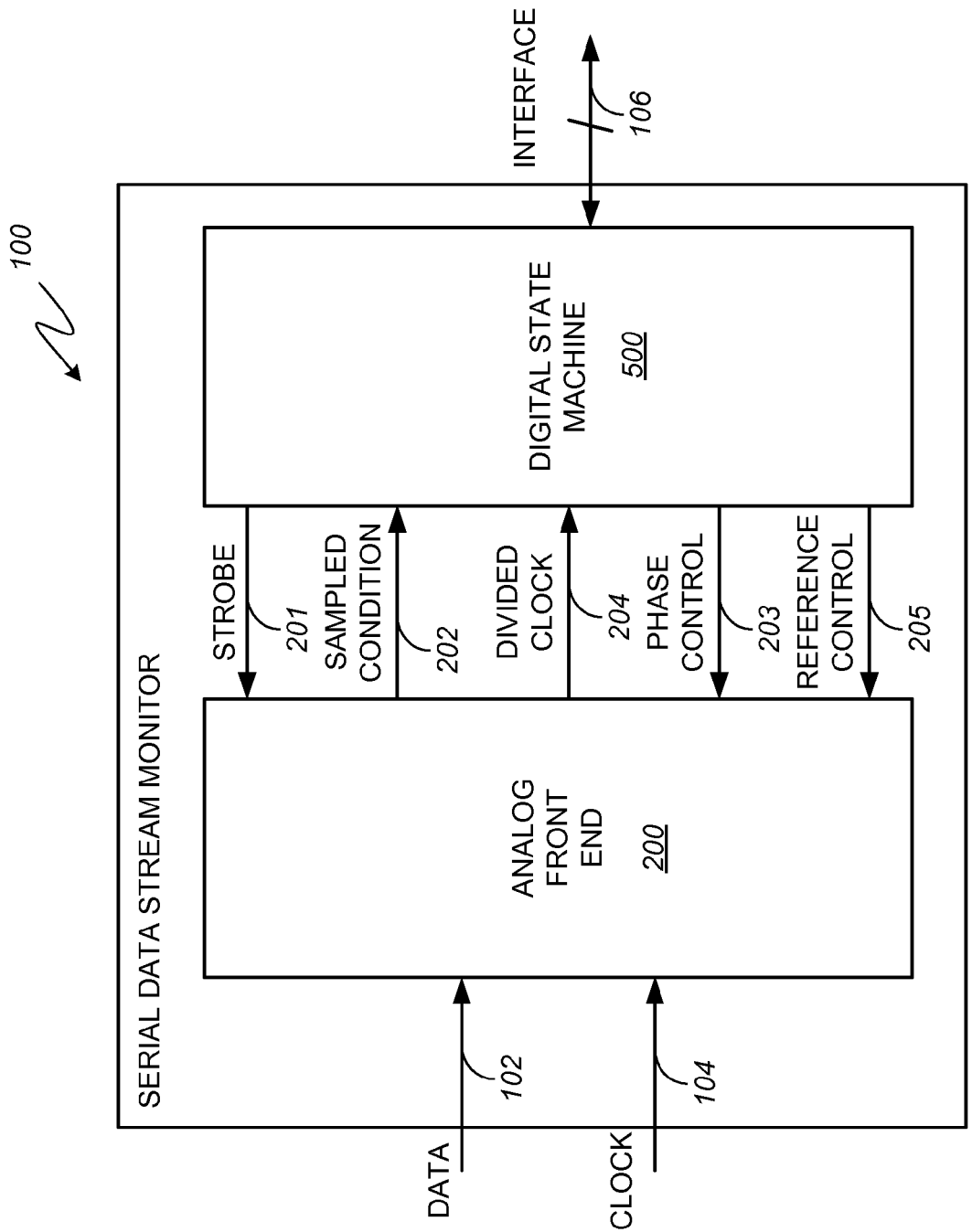
FIG. 1 illustrates a block diagram of an embodiment of a serial data stream monitor.

A serial data stream monitor for quantifying characteristics of a serial data stream samples and stores data signal voltage over a unit interval of time. The unit interval is the minimum elapsed time between condition changes of a data transmission signal. Often, the unit interval corresponds with the time it takes to transmit one data bit. For example, in a serial data transmission system using a non-return to zero transmission with a baud rate of 2.5 Gbits/Sec., a unit interval (UI) is 1/2.5 Gbits/Sec. or 0.4 nS/baud. A set of stored representations of data signal voltages is analyzed to generate a measure of a vertical (peak) opening, a horizontal (jitter) opening and a phase offset (phase at the peak). These digital measures are further provided in the analog domain via a digital-to-analog conversion of the corresponding measures, which can be used to generate an eye diagram.

In an example embodiment, the set of voltages are stored in a data store associated with a digital state machine. The data store includes a N-bit time/horizontal quantization and a M-bit voltage/vertical quantization of the data signal. In a preferred embodiment, N and M are the integer five. Accordingly, the digital state machine includes a data-storage array that will store five-bit digital representations of data signal voltage values over $2^5$ or 32 separate times over a unit interval. Data-storage array sizes are not so limited and can vary with desired voltage and time resolutions. Moreover, the data storage-array can be arranged outside of the digital state machine. The data values stored in the data store can be accessed by devices employing a communication protocol. For example, a two-wire serial data communication protocol can be used to read data values from the data store. Thus, devices external to the serial data stream monitor can receive a measure of present data signal conditions at a receiver in a data communication link.

The serial data stream monitor is a two-stage device with a high-speed analog front end (AFE) and a low-speed digital state machine. The high-speed AFE operates in response to a recovered clock signal from a clock and data recovery system. Clock and data recovery systems generate a clock signal from a frequency reference that approximates the expected serial data transmission rate and phase adjusts or aligns data signals in the received data stream with a phase-locked loop. Clock and data recovery systems are known and well understood by persons having ordinary skill in the art of serial data communication.

The recovered clock is used to generate a half-rate clock signal in the AFE. The half-rate clock operates at one-half the data signal transmission rate of the received data signal. The recovered clock is applied to the differential inputs of an I & Q generator. The I & Q generator produces an in-phase clock signal and a quadrature-phase clock signal that is shifted in phase by 90 degrees from the phase of the in-phase clock signal. I & Q generators are known and well understood in the art of serial data communication.

The half-rate clock is obtained from the output of a four-quadrant phase interpolator that receives the full-rate in-phase and quadrature-phase clock signals from the I & Q generator and a control signal from the digital state machine. The phase interpolator uses a push-pull current digital-to-analog converter (DAC) to controllably adjust the phase of the half-rate clock in accordance with the control signal. At 10 Gbps data transmission rates, the half-rate phase-adjusted clock is adjustable in steps of about 3 pSec. The half-rate phase-adjusted clock is used to controllably sweep a signal condition detector over the UI. In an optional configuration, the half-rate phase-adjusted clock can be forwarded to a clock divider to generate a system clock that can be used by the digital state machine. Thus, data is received at the data transmission rate, the AFE generates a phase-adjusted clock signal that operates at a second rate that is slower than the data transmission rate and when a clock divided clock signal is generated and used by the state machine, or when an external clock signal is used by the state machine, the state machine operates at a third rate that is slower than the second rate. Because the serial data monitor is UI based, the serial data monitor architecture is suitable for different data transmission rates.

A digital-to-analog converter (DAC) receives a second control signal from the digital state machine. The DAC generates VREFHI and VREFLO references voltages in accordance with the second control signal. The reference voltages are set about the common mode of the incoming differential data stream so that the comparison is symmetric. To ensure that the references are set about or offset from the common-mode voltage of the received serial data stream, both the differential data stream and the differential reference voltages are passed through respective linear buffers to achieve a similar output common-mode voltage.

A signal condition detector receives the buffered reference voltages, the buffered serial data stream and the half-rate phase-adjusted clock signal and generates an output that is indicative of a specific signal condition in the received serial data stream. The signal condition detector includes a pair of comparators, an AND logic gate and a latch. One differential comparator compares the buffered data stream with VREFHI while the second differential comparator compares the buffered data stream with VREFLO. The output of the differential comparator that processes (i.e., compares) the VREFHI signal and the data signal is inverted before being provided at a data input of the AND gate. Thus, the first and second differential comparators generate respective outputs responsive to a first comparison between a first reference voltage (VREFHI) and a present voltage of the serial data stream and a second comparison between a second reference voltage (VREFLO) and a present voltage of the serial data stream.

When the time-varying voltage of the data stream is within a certain voltage range identified by a maximum voltage of VREFHI and a minimum voltage of VREFLO, then the first comparator and a logic signal inverter will generate a logical low output and the second comparator will generate a logical high output. On either side of this range or band, i.e., when the serial data stream voltage exceeds the absolute magnitude of VREFHI and VREFLO, the respective outputs of the first and second comparators will be the same (e.g., both logical high, OR both logical low). A logical high at the output of the first comparator and a logical low at the output of the second comparator is invalid for contemplated serial data transmissions and will not occur under normal conditions. Thus, the respective outputs of the first and second comparators generate different logical results when the voltage of the serial data stream is within a range defined by the controllable voltages VREFHI and VREFLO. In addition, the respective outputs of the first and second comparators generate the same logical result when the voltage of the serial data stream is outside the defined range.

The first and second comparator outputs are coupled to a high-speed AND logic gate. In this regard, high-speed indicates that the AND gate functions in accordance with the recovered clock signal. That is, at the rate of the received data signal. As is known, the AND logic gate implements a logical conjunction. That is, a logical high results at the output of the AND logic gate only if both inputs to the AND gate are logical high. The output of the AND logic gate is coupled to the data input of the latch.

The data output of the latch is coupled to a down converter. The down converter receives a strobe signal from the digital state machine. In accordance with a transition of the strobe signal, the down converter samples and forwards the present logical condition of the output of the signal condition detector as provided by the latch to the digital state machine.

In an alternative embodiment, the differential comparators can be operated in a single-ended configuration. Using this configuration option, the AFE can be used to determine the amount of skew (if any) between the differential data signals.

Logic in the digital state machine controllably adjusts a phase control signal and a voltage control signal to step across the unit interval and to vary the reference voltage, respectively. In a preferred embodiment, the AFE of the serial data stream monitor can be enabled (e.g., turned OFF or turned ON) by one or more additional control signals (not shown). Once the digital state machine is enabled, the digital state machine is programmed to automatically turn ON the supply voltages to enable the circuits in the AFE and wait for a programmable period of time for the AFE to stabilize. This automatic power enable behavior can also be disabled as may be desired by a user. If automatic power enable is disabled, a host or user can manually control the power by writing to a control register in the digital block.

Once the digital state machine is active, it periodically issues a strobe signal and in response receives the output of the signal condition detector from the down converter. As explained, the signal condition detector identifies when the received data signal voltage is or is not within a range of voltages defined by VREFHI and VREFLO. In other words, the signal condition detector identifies the open and the close of the data eye. In the described embodiment, the signal condition detector generates a logic high signal when the received data signal voltage is within a range of voltages. This signal condition or HIT occurs when the received data signal voltage is less than VREFHI but greater than VREFLO. This signal condition will typically occur after the voltage reference DAC value exceeds the voltage value of the data at that particular phase interpolator output (i.e., at a particular clock phase). Lower DAC values will always generate {1,1} or {0,0} at the output of the comparators generating a NO HIT condition. The signal condition or HIT over time is then down converted in terms of clock speed to be used by the digital state machine. The digital state machine logic is arranged to accumulate a programmable number of samples. A programmable number of samples allows user to change the resolution of the data sampling points. When the sample is associated with a logic high state, the state machine logic increments a counter. The digital state machine logic is configured to compare the number of accumulated samples with a programmable number of desired samples. Once the defined number of samples has been accumulated, the digital state machine logic compares the value in the counter with a threshold value. If the value in the counter (i.e., the number of times a sample indicated that the data signal voltage is less than VREFHI and greater than VREFLO) is greater than a threshold value, the digital state machine logic performs a check of the value in a horizontal sample counter (HSCtr). Otherwise, when the number of times a sample indicated a HIT condition is less than the threshold value, the state machine logic performs a check of the value in a vertical sample counter (VSCtr).

When the vertical sample counter has saturated, as defined by a comparison of vertical sample counter with a maximum value, the state machine logic moves to the horizontal sample mode. When the vertical sample counter is not saturated, the state machine logic increments the value of the vertical sample counter or Vcontrol by a programmable amount. The value of Vcontrol is forwarded from the state machine to the DAC in the AFE to modify the magnitude of the reference voltages VREFHI and VREFLO. After adjusting the DAC, the state machine logic waits for a programmable period of time to permit the AFE to settle about the new vertical sampling point.

In the horizontal sampling mode, when it is determined that the horizontal sample counter has reached the last horizontal sample point, the digital state machine logic progresses to a data analysis mode, else the digital state machine logic stores the vertical sample value with respect to the present horizontal sample point in the data store and increments the horizontal counter. When the horizontal counter is incremented, the digital state machine logic will return to the data sample accumulation logic.

In the data analysis mode of operation, the digital state machine analyzes the data accumulated with respect to each horizontal sampling point to generate a metric of phase offset at peak, a first voltage representing the peak, and a second voltage representing a horizontal opening.

The digital state machine can be arranged to provide multiple operational modes. For example, the state machine can be configured to provide one or more of an automatic, a manual, a single-cycle or a continuous mode of operation. In an automatic mode, the state machine performs all steps until the data storage is full. In a manual mode, the state machine performs each step and thereafter waits for a signal before performing a subsequent step. In a single-cycle mode, the state machine performs a complete iteration through the logic and thereafter waits for a signal before performing a next iteration or cycle of the logic. In a continuous mode, the state machine continues to perform overwriting data values until commanded to stop. In one or more of the various operation modes, the digital state machine can be arranged to issue an interrupt signal. In addition, the digital state machine can be arranged to automatically scale the signal voltage range and/or issue an interrupt signal with respect to an identified horizontal or vertical eye opening. The use of configurable device addresses in conjunction with a two-wire serial data communication protocol with the serial data monitor will enable a remote host or other digital circuits coupled appropriately to the digital state machine to achieve complete control of the serial data monitor. The disclosed features and advantages of the serial data monitor and method for quantifying characteristics of a serial data stream will now be described with reference to the illustrative, or exemplary, embodiments shown in FIGS. 1-9, in which like reference numerals represent like elements or features.

FIG. 1 illustrates a block diagram of an embodiment of a serial data stream monitor 100. As shown in FIG. 1, the serial data stream monitor operates under the control of various signals communicated over an interface 106. The serial data stream monitor 100 receives a serial data signal at a first input 102 and a clock signal at a second input 104. Although the data and clock signals are shown in the example embodiment as single-ended signals, this convention is presented for simplicity of illustration and explanation. It should be understood that the received data and clock signals may be arranged in differential configuration where both a DATA and a NOT or inverse DATA signal and a CLOCK and NOT or inverse CLOCK signal are received. As described, the received data stream and clock signals, whether single ended or differential, may originate in a clock and data recovery system associated with a receiver of the serial data stream.

As further illustrated in FIG. 1, the serial data stream monitor 100 includes an analog front end (AFE) 200 and a digital state machine 500. The AFE 200 receives the serial data stream at input 102 and the clock at input 104. The AFE 200 operates in response to the received data and clock signals as well as a strobe input signal on connection 201, a phase control signal on connection 203 and a voltage or reference control signal on connection 205. The strobe input signal, the phase control signal and the reference control signal are generated by and communicated from the digital state machine 500. In response to the strobe input signal, the phase and reference control signals, and the received data and clock signals the AFE 200 generates and forwards a sampled signal condition on connection 202 to the state machine 500. As described, the sampled signal condition is indicative of when the signal voltage is within a controllable and defined range of voltages. Specifically, when the data signal voltage is less than VREFHI and greater than VREFLO.

The received data and clock signals operate at a data transmission rate, which may be on the order of tens of Gbits/Sec. when data is transmitted and received along optical fiber, printed-circuit board traces, other conductors or via radio-frequencies. The AFE 200 generates a phase-adjusted clock signal in response to the phase control signal on connection 203 that operates at a second rate that is slower than the data transmission rate. The digital state machine 500 operates in accordance with a local or digital domain clock signal that operates at a third rate, which is slower than the second rate. In an optional embodiment, the AFE 200 generates a divided clock signal that is provided to the digital state machine 500 along connection 204. The divided clock signal provided on connection 204 is generated from the received clock on connection 104 operates at a rate that is slower than both the first or data transmission rate and the second rate.

The digital state machine 500 receives the sampled signal condition on connection 202, when provided, the optional divided clock signal on connection 204, and a host of various external control and data values via interface 106. In an example embodiment, the interface 106 may be a data bus arranged to provide a mechanism for communicating various control signals to and various data values from the digital state machine 500. These mechanisms may include a two-wire serial interface and accompanying protocol for receiving various data values and control signals from devices coupled to the digital state machine 500. Furthermore, these mechanisms provide for the controllable transmission of various data values to or from a data store within or in communication with the digital state machine 500. Moreover, these mechanisms provide for the transmission of a measure of phase offset at peak, a first voltage representing the peak, and a second voltage representing a horizontal opening, which are generated by the digital state machine 500 or alternatively can be generated by one or more external devices using the data values communicated from a data store associated with the digital state machine 500.

Figure 2:
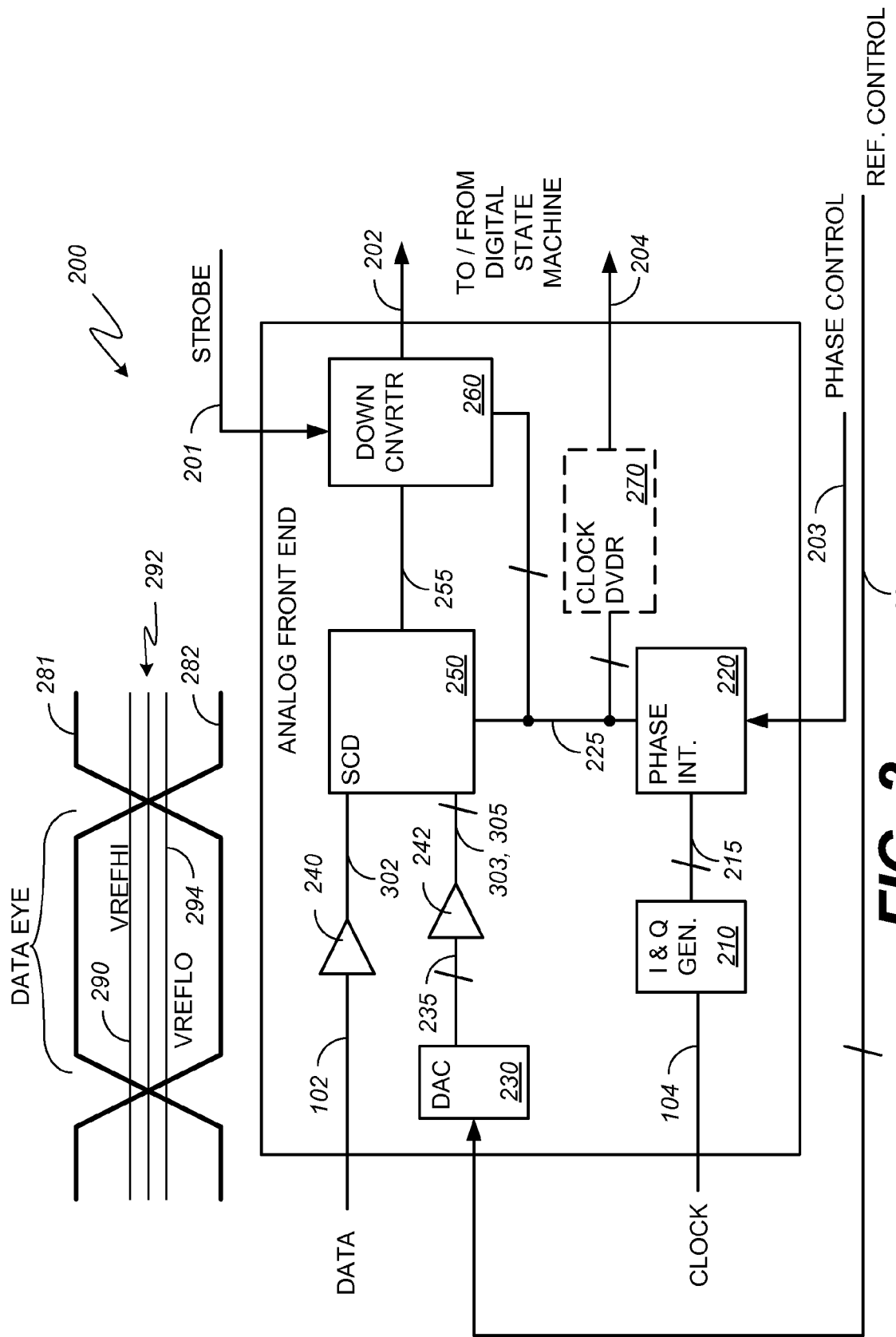
FIG. 2 illustrates a block diagram of an embodiment of the analog front end of the serial data stream monitor of FIG. 1.

FIG. 2 illustrates an example embodiment of the AFE 200. The AFE 200 includes an I & Q generator 210, a phase interpolator 220, a digital-to-analog converter (DAC) 230, a buffer 240, a buffer 242, a signal condition detector (SCD) 250, a down converter 260 and an optional clock divider 270. Although the data and clock signals, control signals and the various internal connections are shown in the example embodiment as single-ended signals, this convention is presented for simplicity of illustration and explanation. Alternative embodiments of the AFE 200 can be arranged to support differential data and clock signals. The arrangement of circuit elements to support differential data and clock signals is known and well understood by persons having ordinary skill in the art of serial data communication.

As described, the AFE 200 receives a recovered clock signal on connection 104. The recovered clock signal may operate at the data transmission rate or at a rate that is derived or subdivided from the data transmission rate. However recovered and presented, the clock signal on connection 104 operates at a first rate. The I & Q generator 210 receives the clock signal along connection 104 and generates an in-phase clock signal and a quadrature-phase clock signal that are coupled to the phase interpolator 220 along connection 215. As is known, the quadrature-phase clock signal is separated or shifted in phase by 90 degrees from the phase of the in-phase clock signal.

The phase interpolator 220 receives a phase control signal on connection 203 from the digital state machine 500 and generates phase-adjusted half-rate clock signals responsive to the in-phase and quadrature-phase clock signals and the phase control signal. The phase-adjusted half-rate clock signals are communicated on connection 225 to the SCD 250, the down converter or sampler 260 and an optional clock divider 270. The phase-adjusted half-rate clock signal on connection 225 operates at a second rate that is slower than the first rate or data transmission rate.

When enabled, the optional clock divider 270 provides a subdivided representation of the phase-adjusted half-rate clock signal on the connection 204 to the state machine 500. The subdivided representation of the phase-adjusted half-rate clock signal on connection 204 operates at a third rate that is slower than the second rate. When not enabled the digital state machine 500 operates in accordance with a digital domain clock that operates at a rate that is approximately an order of magnitude slower than the phase-adjusted half-rate clock signal used to operate the SCD 250 and the down converter 260.

In the illustrated embodiment, the DAC 230 receives a reference control signal on connection 205 from the digital state machine 500 and provides an analog representation of the reference control signal on connection 235. A buffer 242 receives the analog representation of the reference control signal and provides a first buffered version of the reference signal (VREFHI) on connection 303 and a second buffered version of the reference signal (VREFLO) on connection 305. The buffered versions of the reference signal on connection 303 and connection 305 are forwarded to the SCD 250. As further indicated in the embodiment illustrated in FIG. 2, a buffer 240 receives the recovered data signal on connection 102 and forwards a buffered version of the recovered data signal on connection 302 to the SCD 250. The SCD 250, operating in accordance with the phase-adjusted half-rate clock signal on connection 225, the buffered version of the recovered data signal on connection 302, and the reference signals provided on connection 303 and connection 305, generates an output signal indicative of when the recovered data signal voltage is less than VREFHI and greater than VREFLO. The output signal is provided on connection 255 to an input of the down converter 260. The down converter or sampler 260 operates in accordance with the phase-adjusted half-rate clock signal to accumulate or otherwise store samples of the signal condition signal on connection 255. In accordance with a transition of the strobe signal provided on connection 201, the down converter or sampler 260 transmits a sampled version of the output from the SCD 250 on connection 202.

The data eye diagram illustrated above the analog front end 200 is representative of repetitive sampling of the signal on data connection 102. For several data transmission codes, the pattern formed by the trace 281 and the trace 282 appears as a series of "eyes" between a lower and an upper rail where the lower rail is at the logic low voltage level and the upper rail is at the logic high voltage level. A first reference voltage, VREFHI, is represented by trace 290. A second reference voltage, VREFLO, is represented by trace 294. These first and second reference voltages are proximal to the common-mode voltage of the data signal represented by trace 292.

Figure 3:
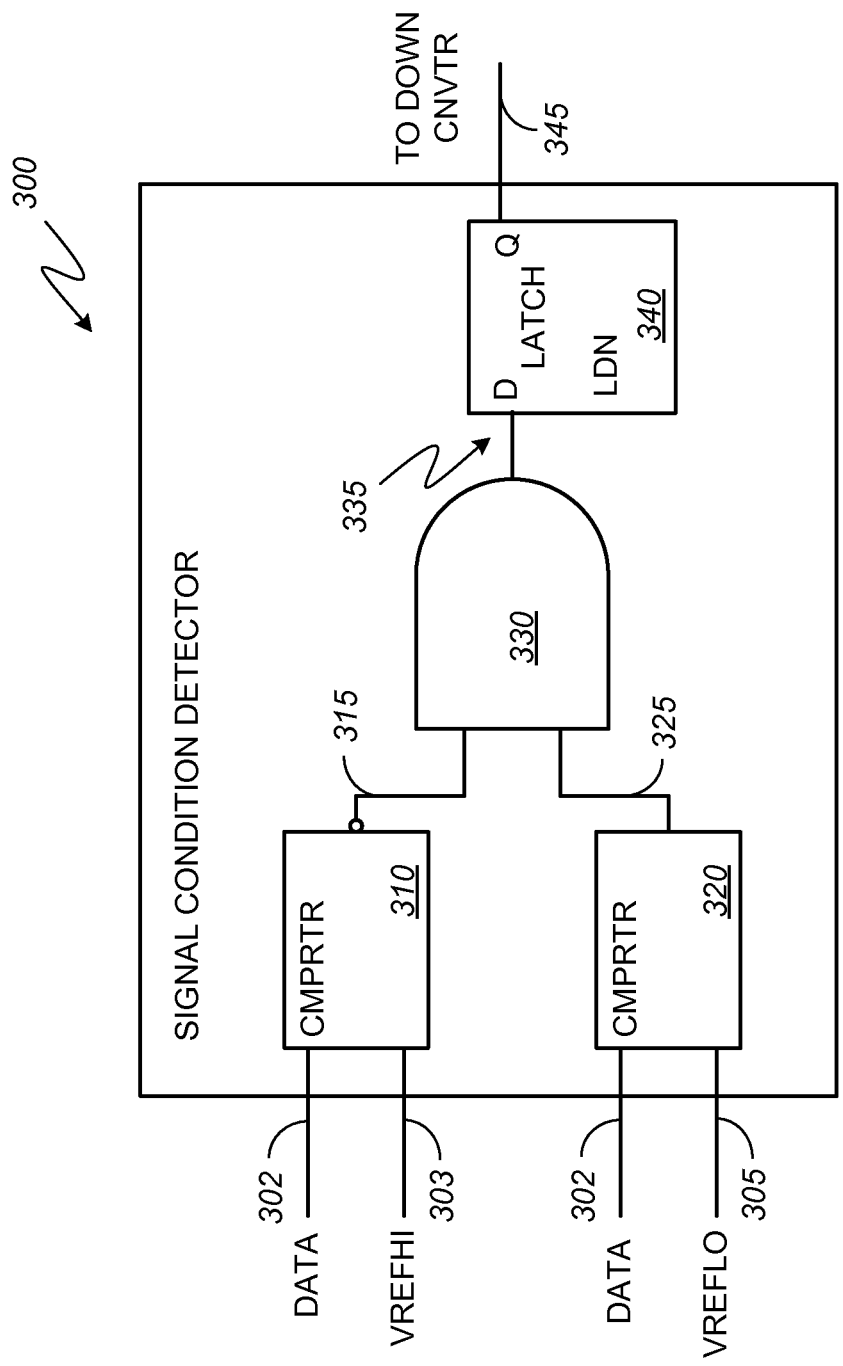
FIG. 3 illustrates a block diagram of an embodiment of the signal condition detector of FIG. 2.

FIG. 3 illustrates an example embodiment of the signal condition detector (SCD) 250 of FIG. 2. The SCD 250 receives a data signal on connection 302, a first reference signal VREFHI on connection 303 and a second reference signal VREFLO on connection 305. The SCD 250 includes a first comparator 310, a second comparator 320, an AND logic gate 330 and a data latch 340. The data inputs of the first comparator 310 are coupled to connection 302 and connection 303. The output of the first comparator 310 is coupled to an input of the AND logic gate 330 via connection 315. As indicated in FIG. 3, the output of the first comparator 310 is logically inverted. The output of the second comparator 320 is coupled to an input of the AND logic gate 330 via connection 325. The output of the AND logic gate 330 is coupled to the data input of the latch 340 via connection 335. The data output of the latch 340 is coupled to an input of the down converter 260 (FIG. 2) via connection 255. The SCD 250 provides a representation of a present state of the recovered and buffered data signal received on connection 202. As described, the representation is a time-varying indication of when the recovered and buffered data signal voltage is less than VREFHI and greater than VREFLO.

Figure 4:
FIG. 4 illustrates an embodiment of a signal condition evaluation table.

FIG. 4 illustrates an embodiment of a signal condition evaluation table. As indicated in FIG. 4, a first comparator such as the comparator 310, as a result of comparing the received data signal with the VREFHI signal, generates one of two logical values (i.e., a binary zero bit or a binary one). A binary zero bit represents the relative condition at the inputs of the comparator 310 when the data input voltage is less than VREFHI. Similarly, a second comparator such as the comparator 320, as a result of comparing the received data signal with the VREFLO signal, generates one of two logical values. A binary one bit represents the relative condition when the data input voltage is greater than VREFLO.

As indicated in the signal condition evaluation table 400, when the results of the first comparison and the second comparison have the same logical value (i.e., both results are a binary zero bit or both results are a binary one bit), the signal voltage is outside of the range defined by the reference voltages and a NO HIT condition is indicated. As further shown in the signal condition evaluation table 400, signal transmission systems contemplated with the serial data stream monitor are not expected to generate a situation where the result of the first comparator is a binary one bit and the result of the second comparator is a binary zero bit. Stated another way, under normal operating conditions it will never be the case that the data signal voltage will exceed the VREFHI value and not exceed the VREFLO value. Accordingly, the state represented by (1, 0) in the signal condition evaluation table 400 is invalid. As also indicated by the signal condition evaluation table 400, when the results of the first comparison and the second comparison are different and the first comparison results in a binary zero bit, the data signal voltage is indicative of a HIT (i.e., the data signal voltage is less than VREFHI and greater than VREFLO).

Figure 5:
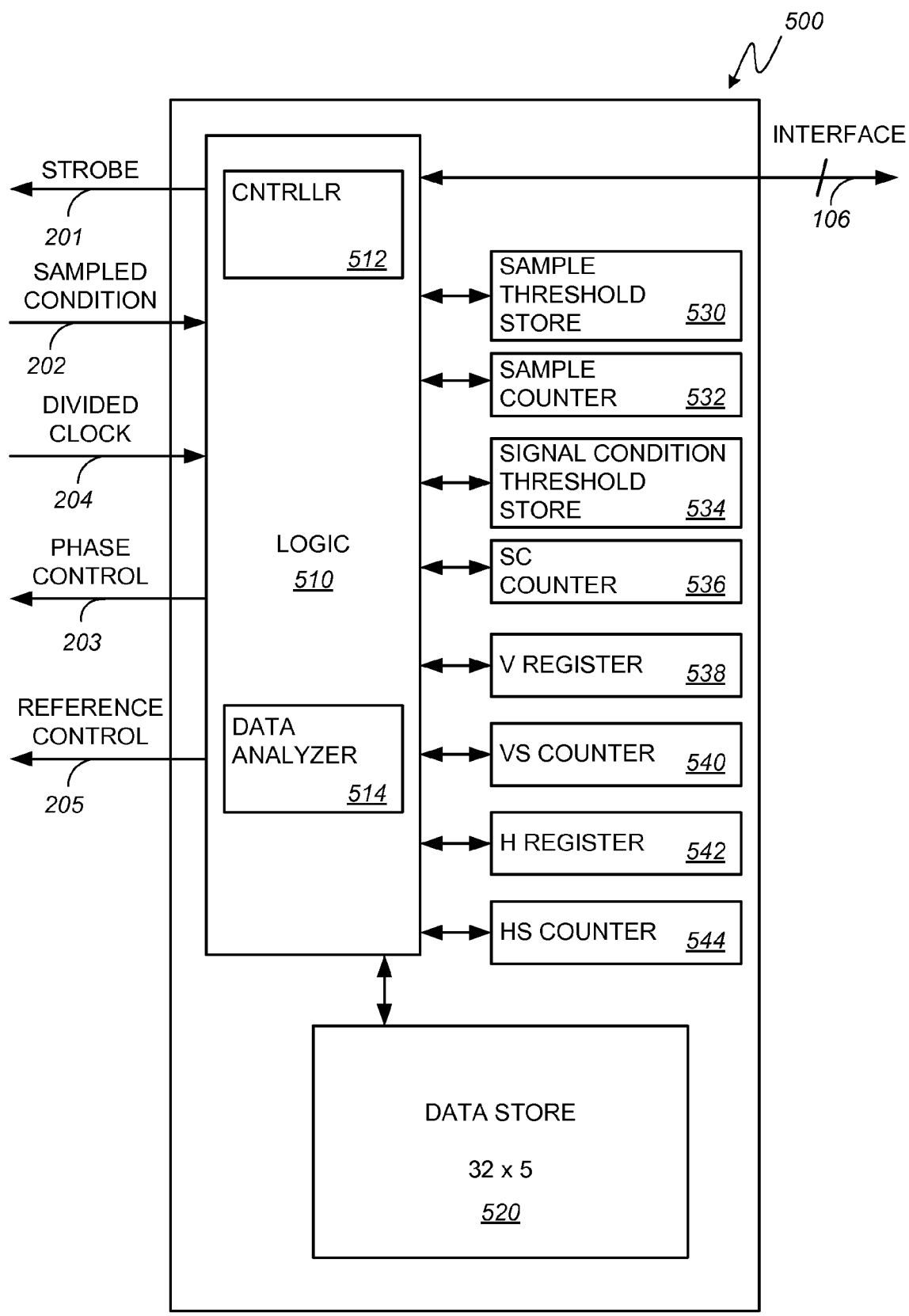
FIG. 5 illustrates a block diagram of an embodiment of the digital state machine of the serial data stream monitor of FIG. 1.

FIG. 5 illustrates a functional block diagram of an embodiment of the digital state machine 500. The digital state machine 500 operates in accordance with a clock signal that is slower than both the recovered data and clock signals and the phase-adjusted half-rate clock used by the signal condition detector in the AFE 200 to identify when the data signal voltage is less than an amplitude defined by the DAC 230 (FIG. 2).

The digital state machine 500 can operate in accordance with a digital domain clock or when provided by the AFE 200, a divided clock that is generated from the phase-adjusted half-rate clock generated and used in the AFE 200. As indicated in FIG. 5, the digital state machine 500 receives various signals from external sources along interface 106. The interface 106 is used to provide access to registers for initializing and controlling the state machine 500.

The digital state machine 500 includes logic 510, a data store 520 and various counters or data registers for holding data values. The logic 510 includes various mechanisms for reading data values from and writing data values to the various counters and registers and the data store 520. Among the counters and registers is a sample threshold store 530, a sample counter 532, a signal condition threshold store 534, a signal condition (SC) counter 536, a vertical or voltage (V) register 538, a vertical or voltage step (VS) counter 540, a horizontal or phase (H) register 542, and a horizontal or phase step (HS) counter 544. The sample threshold store 530 is arranged to store a programmable or desired number of data samples that are to be accumulated in the digital state machine 500. The sample counter 532 is arranged to store a value indicative of a present number of accumulated data samples. The logic 510 will include a mechanism for comparing the value in the sample threshold store 530 with the value in the sample counter 532. The signal condition counter 534 is arranged to store a value indicative of the present number of confirmed signal conditions across the received samples. The signal condition threshold store 536 is arranged to store a value indicative of the number of confirmed signal conditions desired across the accumulated samples. The logic 510 will include a mechanism for comparing the value in the signal condition counter 534 with the value in the signal condition threshold store 536.

The vertical or voltage register 538 stores a value indicative of a reference voltage. The vertical or voltage step counter 540 stores a value indicative of the present count or relative position of the amplitude or voltage reference over the entire scale or range of signal voltages. For example, when the digital state machine 500 is arranged to sweep across a received signal with a 50 mVolt peak amplitude in 32 steps, the vertical or voltage step counter will store a present count of any one of 0, 1, 2, . . . , 31 as the logic 510 executes. Each step adjustment under these conditions will result in a change of about 1.6 mVolt.

The horizontal or phase register 542 stores a value indicative of a phase control voltage. The horizontal or phase step counter 544 stores a value indicative of the present count or relative position in phase over the entire unit interval. For example, when the digital state machine 500 is arranged to sweep across a unit interval in 32 steps the horizontal or phase counter will store a present count of any one of 0, 1, 2, . . . , 31, as the logic 510 executes.

The logic 510 includes a controller 512, which is arranged to communicate with various external devices via the interface connection 106, as well as generate and transmit the strobe signal and the phase and reference control signals. The logic 510 further includes a data analyzer 514, which is arranged to calculate or otherwise determine a measure of phase offset at peak, a first voltage representing the peak, and a second voltage representing a horizontal opening.

The strobe signal, which can be a pulse that after a brief time returns to a steady-state logic level, is transmitted on connection 201 to the down converter 260 of the AFE 200. As described, the down converter 260 provides a sampled version of the condition identified by the signal condition detector 250 on connection 202, which is available for use in the logic 510.

The phase control signal can be a P-bit digital word, where P is an integer. When P is equal to the integer 4, the phase control signal on connection 203 can provide $2^4$ or 16 different control levels to the phase interpolator 220. In a preferred embodiment P is equal to the integer 5 and provides 32 different control levels to the phase interpolator 220. Alternatively, the digital state machine 500 can be arranged with a digital-to-analog converter to generate and provide an analog version of the phase control signal to the phase interpolator 220.

Similarly, the reference control signal can be a V-bit digital word, where V is an integer. When V is equal to the integer 5, the reference control signal on connection 205 provides $2^5$ or 32 discrete control levels to the DAC 230 of the AFE 200. In the embodiment illustrated in FIG. 2, the DAC 230 generates two outputs that are processed by a buffer to ensure that the reference inputs at the comparators of the signal detector are equally disposed in amplitude from a common-mode voltage. Alternatively, the digital state machine could be configured with DACs and buffers to provide analog reference signals to the AFE 200.

Figure 6:
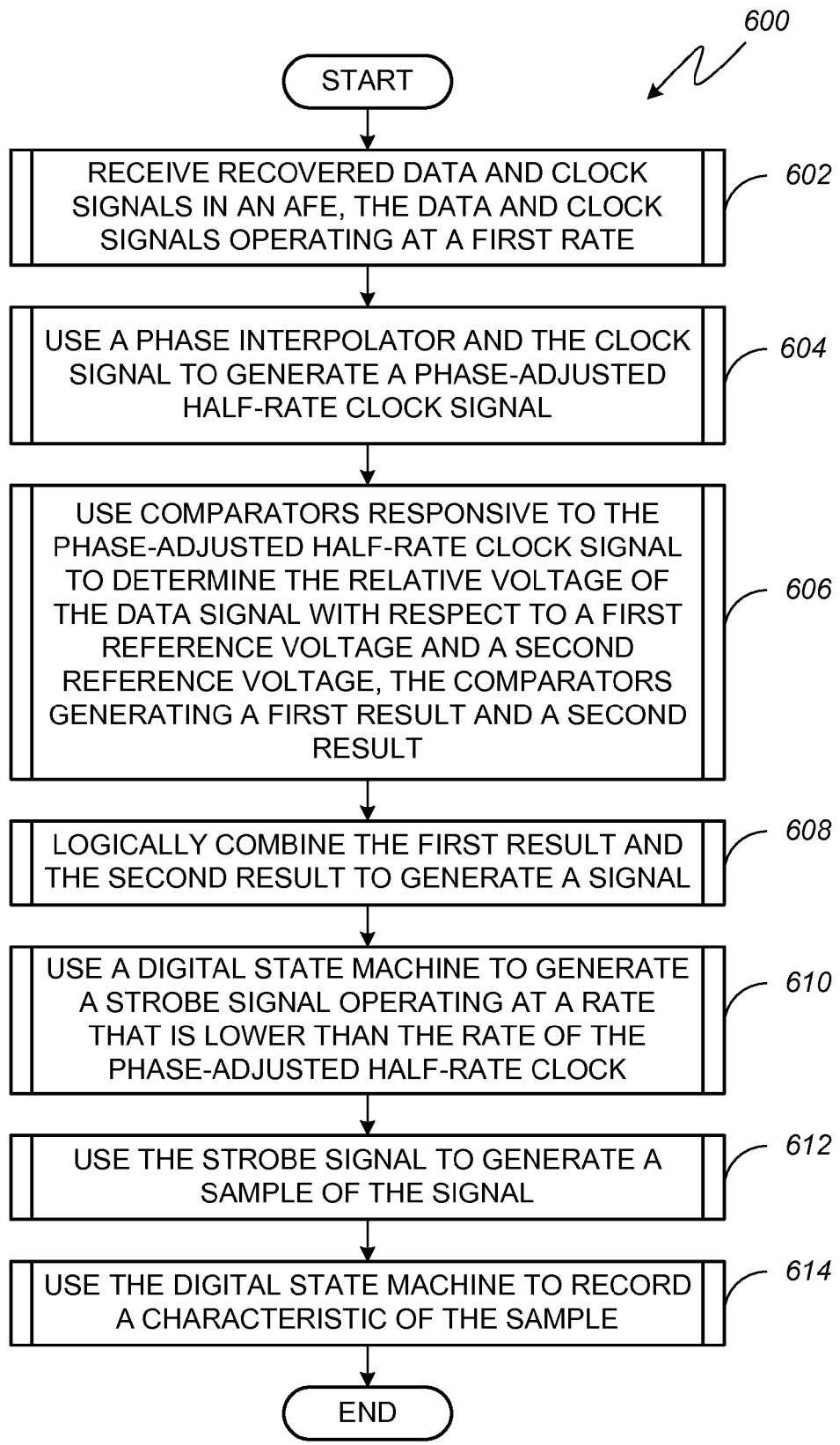
FIG. 6 illustrates a flow diagram of an embodiment of a method for quantifying a characteristic of a received serial data stream.

FIG. 6 illustrates a flow diagram of an embodiment of a method 600 for quantifying a characteristic of a received serial data stream. The method 600 begins with block 602 where recovered data and clock signals are received in an AFE 200. As further indicated in block 602, the recovered data and clock signals operate at a first rate. In block 604 a phase interpolator and the recovered clock signal are used to generate a phase-adjusted half-rate clock signal. As described, the phase interpolator may be a four-quadrant phase interpolator that is responsive to a digital control word. In a preferred embodiment, the control word comprises 5-bits to provide $2^5$ or 32 distinct control steps across a unit interval.

Thereafter, as indicated in block 606 comparators responsive to the phase-adjusted half-rate clock signal are used to determine the relative voltage of the recovered data signal with respect to a first reference voltage and a second reference voltage. As further indicated in block 606, the comparators generate a first result and a second result, respectively. Next, as indicated in block 608, the first result and the second result are logically combined to generate a combined signal. In block 610 a digital state machine is used to generate a strobe signal. The strobe signal operates at a rate that is slower than the rate of the phase-adjusted half-rate clock. In block 612 the strobe signal is used to generate a sample of the combined signal. In block 614 the digital state machine is used to record a characteristic of the sample.

Figure 7:
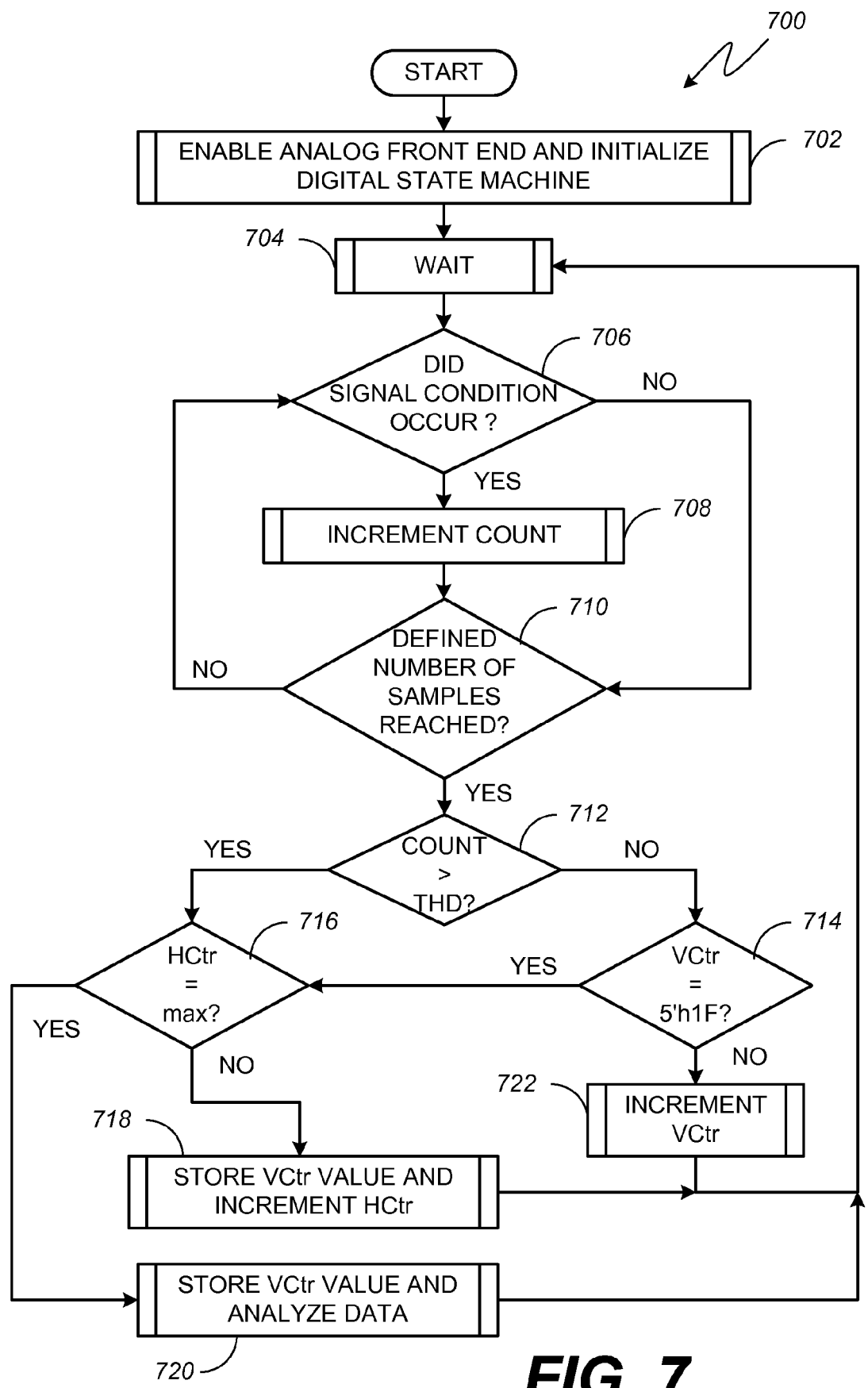
FIG. 7 illustrates a flow diagram of an embodiment of the operation of the digital state machine of FIG. 1.

FIG. 7 illustrates a flow diagram 700 of an embodiment of the operational logic 510 within the digital state machine 500. The operational logic 510 when executed by the various circuits of the digital state machine 500 enables the digital state machine 500 to perform the method 700. The method 700 begins with block 702 where the logic 510 enables the various elements of the AFE 200 and initializes or configures one or more operational parameters of the digital state machine 500 of the serial data stream monitor 100. In block 704, the logic 510 waits for a programmable duration of time. Thereafter, as indicated in decision block 706, the digital state machine 500 receives a sample from the AFE 200 and the logic 510 determines whether the value of the sample indicates that the recovered data signal is less than VREFHI and greater than VREFLO. When the sample indicates that the data signal voltage is less than VREFHI and greater than VREFLO, the logic 510 increments a counter as indicated in block 708 and determines whether a defined number of data samples have been accumulated by the digital state machine 500 as indicated in decision block 710. Otherwise, when the result of the determination in decision block 706 is negative, the logic 510 continues with the query in decision block 710.

When the number of accumulated data samples has not reached a defined or programmable number of desired samples the logic 510 returns to decision block 706. Otherwise, when the number of accumulated data samples has reached the defined or programmable number of desired samples, the logic 510 performs the query in decision block 712 to determine if the recorded number of HIT conditions as stored in the counter has exceeded a threshold value.

When the number of HIT conditions has not exceeded the threshold value, the logic 510 performs the query in decision block 714 to determine if the value in the voltage or vertical control register has reached a programmable maximum value.

When the value in the voltage or vertical control register has not reached the programmable maximum value, the logic 510 increments the value in the voltage or vertical control register by a predetermined value, as indicated in block 722 and returns to block 704 to wait for a programmable time for the AFE 200 to settle at the new value.

When the value in the voltage or vertical control register has reached the programmable maximum value, as determined by the query in decision block 714, or when the recorded number of HIT conditions as stored in the counter has exceeded a threshold value, as determined by the query in decision block 712, the logic 510 determines whether the value in a horizontal counter has reached the maximum number of horizontal samples, as indicated in decision block 716.

When the value in the phase or horizontal control register has not reached the programmed maximum value, as determined by the query in decision block 716, the logic 510 stores the value in the voltage or vertical control register and increments the horizontal counter, as indicated in block 718. Thereafter, the logic 510 returns to block 704 to wait for a programmable time for the AFE 200 to settle at the new or adjusted clock phase. When the value in the phase or horizontal control register has reached the programmed maximum value, as determined by the query in decision block 716, the logic 510 stores the value in the voltage or vertical control register and enters a data analysis mode, as indicated in block 720. In the illustrated embodiment, the logic 510 returns to block 704 to wait for a programmed time before repeating the data monitoring, collection and analysis stages. It should be understood that the logic 510 may generate additional signals such as a first interrupt to indicate to one or more devices external to the serial data monitor 100 that the digital state machine has completed the data monitoring and collection stages and has entered a data analysis stage. In addition, a second interrupt or control signal could be generated and communicated to indicate that the data analysis stage is completed. These interrupts or additional control signals can be used to control one or more operational modes of the digital state machine.

A measure of the phase offset at peak can be generated as an approximation with respect to the analog data eye waveform because the phase of the recovered clock is not known exactly when the phase interpolator output is at zero. For example, the first phase interpolator DAC value at which the maximum vertical opening occurs can be used as a measure of the phase offset. The maximum voltage reference DAC value recorded provides a measure of the vertical eye opening. An external calibration of the DAC can be used to translate the recorded maximum value to an analog voltage. A measure of the horizontal eye opening can be determined as a percentage of a maximum eye opening. For example, the horizontal eye opening can be determined by dividing the number of phase interpolator states which have a voltage reference DAC value that exceed a threshold value by the total number of phase interpolator states multiplied by 100 (n/32 (5-bit example) *100, where n is the number of PI states which have a voltage reference DAC value that exceeds the defined threshold value). The threshold for the horizontal eye opening is set by the user prior to enabling the digital state machine.

Figure 8:
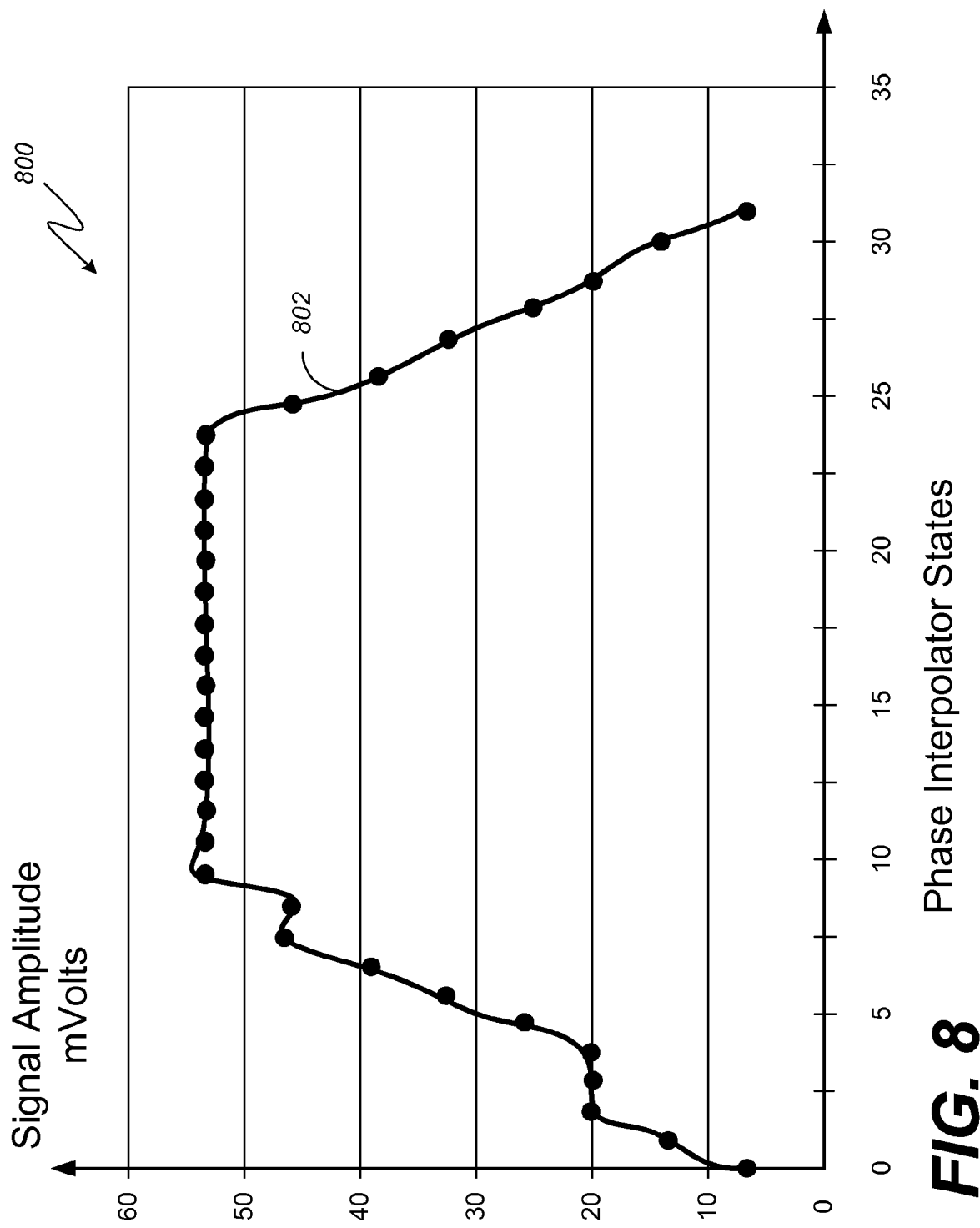
FIG. 8 illustrates a plot of an analog signal generated from the voltages stored in the data store of the digital state machine.

FIG. 8 illustrates a plot of an analog signal generated from the values stored in the data store 520 of the digital state machine 500. The plot 800 illustrates phase interpolator states across a unit interval along the abscissa and signal amplitude in millivolts along the ordinate. As described, the serial data monitor 100 uses $2^5$ or 32 separate data points equally spaced across the unit interval. As illustrated in the plot 800, the 32 separate data points are in registration with respective phase interpolator states zero through thirty-one. Signal trace 802 is generated by locating the vertical or voltage value stored in the data store 520 of the digital state machine 500 for each of the respective phase interpolator states. As shown in FIG. 8, the example signal trace 802 transitions non-linearly from approximately 8 mVolts at phase interpolator state 0 to about 53 mVolts at phase interpolator state 11. The signal trace 802 is at about 53 mVolts for a total of 15 phase interpolator states. Thereafter, the signal trace 802 transitions in a linear fashion to about 8 mVolts at phase interpolator state 31.

Figure 9:
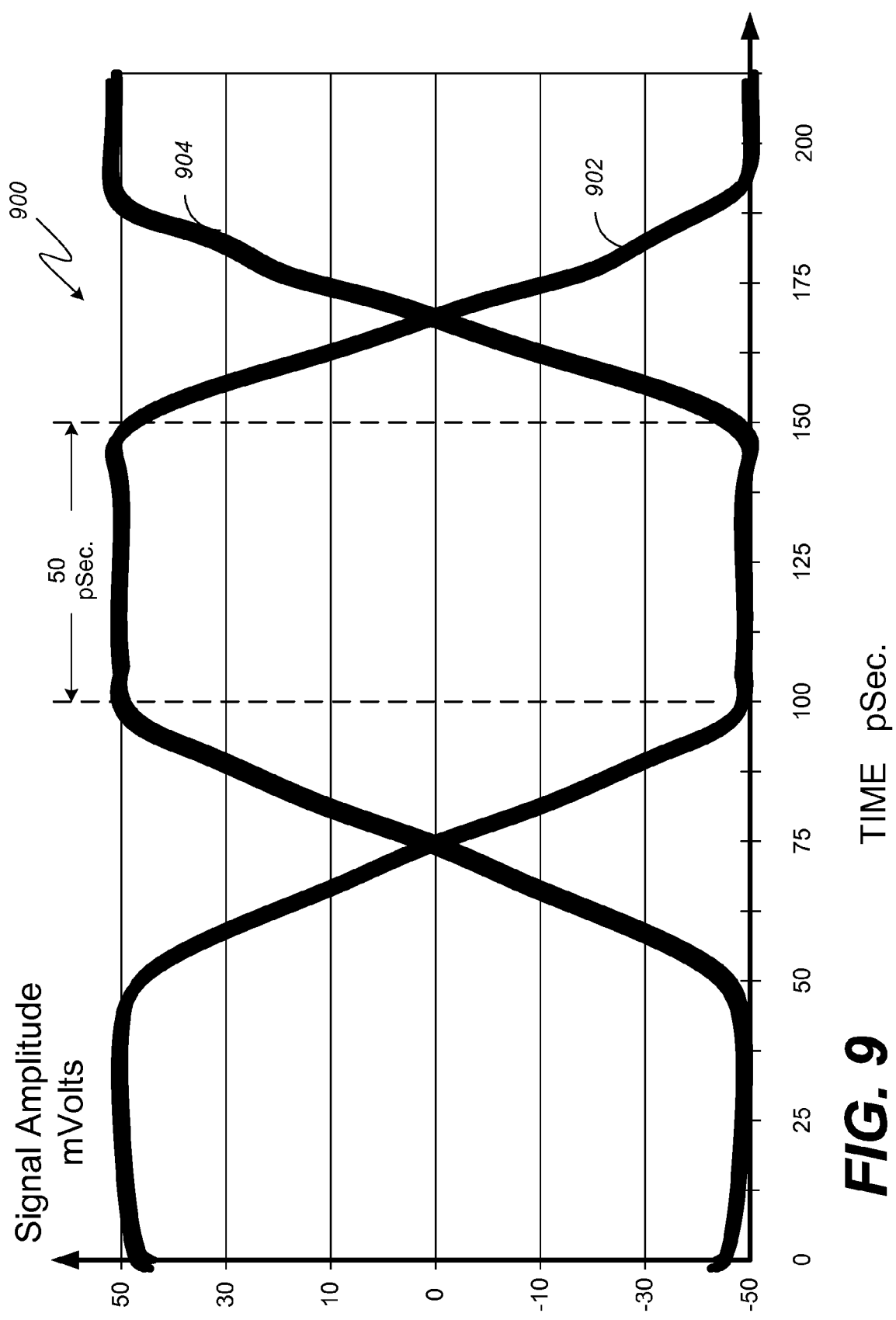
FIG. 9 illustrates a plot of an eye diagram that can be generated from the serial data stream monitor of FIG. 1.

FIG. 9 illustrates a plot of an eye diagram 900 that can be generated from the serial data stream monitor 100 of FIG. 1 and more specifically from the example analog signal trace 802 illustrated in FIG. 8. The plot 900 illustrates time in picoseconds along the abscissa and signal amplitude in millivolts along the ordinate. Signal trace 902 represents the received data signal over time. Signal trace 904 represents the inverse or NOT data signal over time. For a serial data stream operating at about 10 Gb/Sec., the separation in time between the phase interpolator states is about 3 pSec. Thus, the signal trace 902 and the signal trace 904 indicate that the data signal and NOT data signal are at or about their peak values of about 50 mVolts for about 50 pSec.

The various example embodiments illustrated in FIGS. 1-9 and described above have been presented for the purpose of demonstrating the principles and concepts of the serial data stream monitor and methods for quantifying characteristics of a serial data signal. The various example embodiments depict a circuit architecture and data processing methods that sample and trace the inner "eye" of a data stream and generate a quantized trace of the inner eye mask. The approach allows for the detection of all data signal conditions where the data signal voltage is within a controllable and defined range without dramatically increasing power and circuit footprint demands when embodied in an integrated circuit. Moreover, because the circuit architecture and associated data processing are based on a unit interval, the serial data stream monitor can be deployed over a broad range of radio-frequency, wired and fiber-optic communication medium based systems operating over a broad range of data transmission rates. By avoiding the need to redesign the integrated circuits used to receive serial data transmissions, a substantial cost savings is realized while still providing accurate measures of signal characteristics in the recovered version of the serial data stream.

While the serial data stream monitor and methods for quantifying a characteristic of a serial data stream have been described in association with the illustrated embodiments, those skilled in the art will understand that a variety of logical configurations may be used for this purpose. Thus, the serial data stream monitor and methods for quantifying a characteristic of a serial data stream are not limited to the described embodiments.

What is claimed is:

1. A serial data stream monitor, comprising:
an analog front end having a data input and a clock input operating at a first rate, the analog front end including a signal condition detector arranged to receive a serial data stream at the data input and reference signals at a second input and a third input, respectively, the signal condition detector generating a representation of the serial data stream amplitude at a signal condition detector output in response to a phase-adjusted signal from a phase interpolator operating at a second rate that is slower than the first rate and in response to a comparison of the serial data stream and the reference signals, the analog front end further including a down converter arranged to receive the representation of the serial data stream from the signal condition detector output; and
a digital state machine having a strobe output coupled to a control input of the down converter and arranged to receive the representation of the serial data stream from the down converter, the digital state machine including logic and a data store, the digital state machine operating at a third rate that is slower than the second rate.

2. The serial data stream monitor of claim 1, wherein the analog front end further includes a digital-to-analog converter that generates the reference signal in accordance with a first control signal from the digital state machine.

3. The serial data stream monitor of claim 2, wherein the analog front end further includes a reference signal buffer having an input coupled to an output of the digital-to-analog converter and an output coupled to the detector.

4. The serial data stream monitor of claim 1, wherein the analog front end further includes a data signal buffer having an input coupled to the serial data stream and an output coupled to the data signal condition detector.

5. The serial data stream monitor of claim 1, wherein the analog front end further includes a clock generator having an input that receives a clock signal from the clock input and generates in-phase and quadrature-phase output signals coupled to the phase interpolator.

6. The serial data stream monitor of claim 1, wherein the phase interpolator operates in accordance with a phase control signal received from the digital state machine.

7. The serial data stream monitor of claim 1, wherein the phase interpolator operates over 4-quadrants.

8. The serial data stream monitor of claim 1, wherein the signal condition detector includes first and second comparators, an AND logic gate, and a latch.

9. The serial data stream monitor of claim 8, wherein the first and second comparators generate respective outputs responsive to a comparison of a first reference voltage and the serial data stream and a second comparison of a second reference voltage different from the first reference voltage and the serial data stream.

10. The serial data stream monitor of claim 9, wherein the respective outputs of the first and second comparators are logically combined in the AND logic gate to identify a condition in the serial data stream.

11. The serial data stream monitor of claim 10, wherein the logically combined outputs of the first and second comparators are used by logic in the digital state machine that adjusts a phase control signal and a reference control signal to controllably sweep a range of reference voltages over an interval of time.

12. The serial data stream monitor of claim 11, wherein the logic in the digital state machine is responsive to a count stored in a first register and a sample count value stored in a second register.

13. The serial data stream monitor of claim 12, wherein the logic in the digital state machine compares a number of accumulated data samples as stored in the second register with a threshold value, wherein when the number of accumulated data samples is greater than the threshold value the logic directs the state machine to determine if the count as stored in the first register has exceeded a threshold and wherein when the counter has not exceeded the threshold, the logic stores a voltage value in a location within the data store that is associated with the present horizontal sample point and increments a first counter that stores the number of horizontal sample points.

14. The serial data stream monitor of claim 13, wherein when there is a change in the horizontal sample point, the logic reinitializes the first register and the second register and waits for a programmable time before recording signal conditions in the first register and accumulating the number of samples in the second register.

15. The serial data stream monitor of claim 13, wherein when the first counter has saturated the logic directs the state machine to store a voltage value in a location within the data store that is associated with the present horizontal sample point and analyze the data in the data store to generate a measure of phase offset at peak, a first voltage representing the peak, and a second voltage representing a horizontal opening.

16. The serial data stream monitor of claim 8, wherein the respective outputs of the first and second comparators generate different logical results when the voltage of the serial data stream is within a defined range.

17. The serial data stream monitor of claim 8, wherein the respective outputs of the first and second comparators generate the same logical result when the voltage of the serial data stream is outside a defined range.

18. The serial data stream monitor of claim 1, wherein the signal condition detector is operated in a single-ended signal configuration to identify skew between differential signals.

19. The serial data stream monitor of claim 1, wherein the second rate is one-half the rate of the first rate.

20. A method for quantifying a characteristic of a received serial data stream, the method comprising:
receiving recovered data and clock signals in an analog front end, the received data and clock signals operating at a first rate;
using a phase interpolator and the received clock signal to generate a phase-adjusted half-rate clock signal;
using comparators responsive to the phase-adjusted half-rate clock signal to determine the relative voltage of the data signal with respect to a first reference voltage and a second reference voltage, the comparators generating a first result and a second result, respectively;
logically inverting the first result to generate a modified first result;
logically combining the modified first result and the second result to generate a signal;
using a digital state machine to generate a strobe signal operating at a rate that is lower than the rate of the phase-adjusted half-rate clock;
using the strobe signal to generate a sample of the signal; and
using the digital state machine to record a characteristic of the sample.

* * * * *